W. BARKER.
MACHINES FOR MOLDING METALS.
No. 180,411.        Patented Aug. 1. 1876.
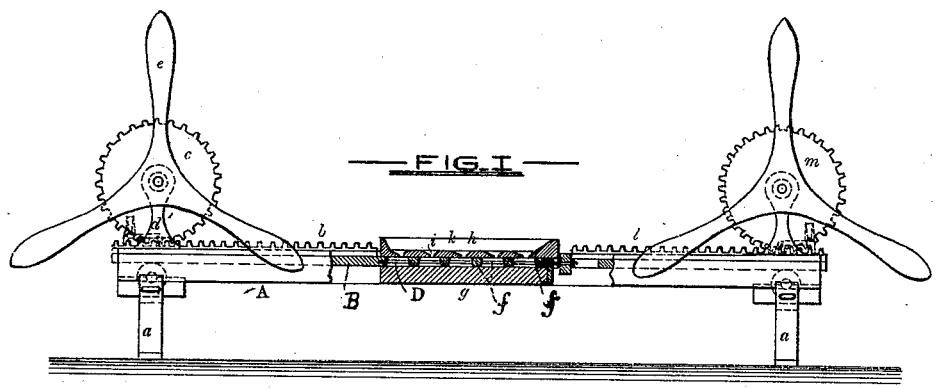

UNITED STATES PATENT OFFICE.

WILLIAM BARKER, OF BALTIMORE, MARYLAND.

IMPROVEMENT IN MACHINES FOR MOLDING METALS.

Specification forming part of Letters Patent No. 180,411, dated August 1, 1876; application filed June 6, 1876.

*To all whom it may concern:*

Be it known that I, WILLIAM BARKER, of the city of Baltimore and State of Maryland, have invented certain new and useful Improvements in Machines for Molding Metals, of which the following is a specification; and I do hereby declare that in the same is contained a full, clear, and exact description of my said invention, reference being had to the accompanying drawing, and to the letters of reference marked thereon.

This invention relates to a machine for molding lead seals, or the devices employed by express and transportation companies, as attachments to the securing-wires of packages or parcels, the said seals being firmly fastened to the said wires, in the operation of stamping certain marks or characters thereon. The said machine is also adapted, by changing the relative positions of certain parts thereof, for the molding of lead and other metals into bars and pigs of various sizes and shapes, as hereinafter set forth.

In the description of a machine embodying my invention which follows, due reference must be had to the accompanying drawing, forming a part of this specification, and in which—

Figure 1 is a side elevation, partly in section, of my improved machine; Fig. 2, a plan of the same, also partly in section; and Fig. 3, also a plan of the invention, but differing from Fig. 2 in that certain parts thereof are shown occupying different relative positions. Figs. 4 and 5 are top views of certain parts of the machine modified in shape.

Similar letters of reference indicate similar parts in all the figures.

A is the frame of the machine, supported by the legs $a$. B is a table adapted to be moved longitudinally of the frame A, by means of a rack, $b$, secured to the upper face thereof, and a gear-wheel, $c$, fastened to the revoluble shaft $d$. The shaft $d$ rests in bearings $d'$, projecting from the top of the frame A, and is rotated through the medium of the handle $e$. The table B is perforated with holes $f$ of the superficial size and shape of the seals or other devices to be molded, the table being of a thickness corresponding to that of the said seals or other devices, and forming the body or main part of the mold. When the table B is in the position shown in Figs. 1 and 2, it is confined closely between the bottom plate $g$ and the gate-plate $h$, with each perforation $f$ directly below an aperture or gate, $i$, extending from the channels $k$. C is a second table, operated by means of the rack $l$ and gear-wheel $m$, in a similar manner to the one B. D D are wires extending horizontally from the inner end of the table C, and, when in the position indicated in Figs. 1 and 2, adapted to extend longitudinally through that portion of the table B in which the perforations or holes $f$ are located.

In Fig. 3 the machine is represented with the tables B and C extended or drawn apart.

Parts of the invention not yet alluded to will be described, and their uses set forth in the description of the operation of my improved machine, which follows: The parts of the machine having been relatively arranged, as shown in Figs. 1 and 2, molten lead poured into the channels $k$, flows through the gates $i$ into the holes $f$, and around the wires D, passing through them. When the metal has become sufficiently chilled, the table C is moved out, thereby withdrawing the wires D from the newly-cast seals, and the table B carried by means of the rack $b$ and gear-wheel $c$ from between the bottom and gate-plates. In this latter operation, the metal in the gates is sheared off, and the seals fall to the floor in a finished condition, or fit to be applied to the securing-wires of packages by stamping, as before alluded to. The chilled metal in the channels $k$ and gates $i$ may then be removed, and the machine arranged for a second pouring. Fixed stops $n$, in connection with the spring-stop $o$, serve to limit the outward movement of the tables, and prevent the entire withdrawal of the wires D from the table B.

In casting metal bars, the table B is formed substantially in accordance with that shown in Fig. 4, and used with a gate-plate corresponding with the one shown in Fig. 5. When it is not desired to have the articles cast perforated, the table C, with the attached wires D, is extended, as shown in Fig. 3, during the molding operation.

I am aware that a perforated movable plate, pierced to receive a double series of wires, as cores for the castings is not new, and such, therefore, I do not claim.

Having thus described my invention, what I claim as new, and wish to secure by Letters Patent of the United States, is—

1. In a machine for molding metals, the combination of the sliding tables B and C, wires D, and bottom and gate plates, represented, respectively, by $g$ and $h$, substantially as and for the purpose specified.

2. In a machine for molding metals, the sliding tables B and C, having the racks $b$ and $l$, in combination with the revoluble gear-wheels $c$ and $m$, substantially as and for the purpose described.

In testimony whereof I hereunto subscribe my name this 2d day of June, in the year of our Lord 1876.

WILLIAM BARKER.

Witnesses:
 THOMAS MURDOCH,
 W. W. WHARTON.